Oct. 25, 1966  W. C. BURGESS, JR  3,280,964
FEEDER BOWL CONSTRUCTION
Filed Sept. 1, 1964  2 Sheets-Sheet 1
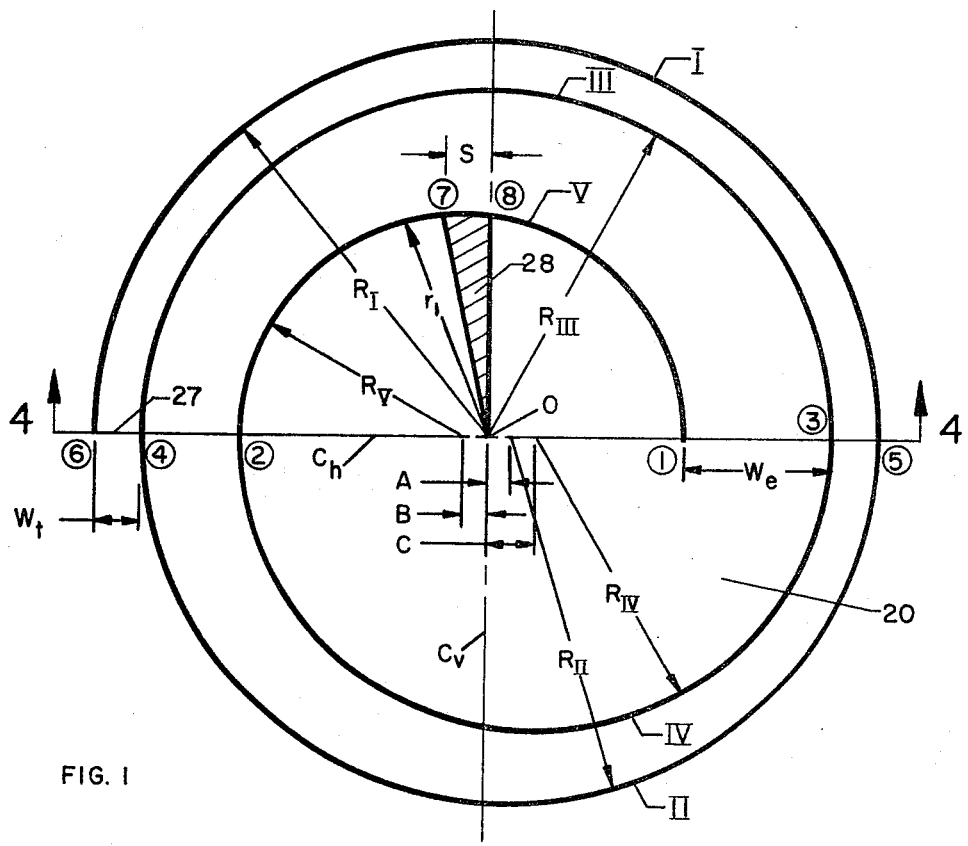
FIG. 1
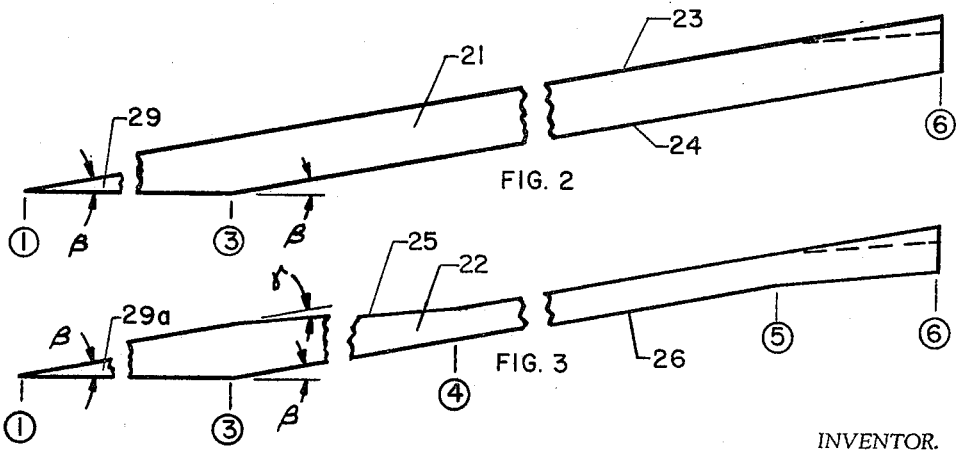
FIG. 2
FIG. 3
INVENTOR.
WARREN C. BURGESS JR.
BY
Schramm, Kramer & Sturges Oct. 25, 1966 W. C. BURGESS, JR 3,280,964
FEEDER BOWL CONSTRUCTION
Filed Sept. 1, 1964 2 Sheets-Sheet 2
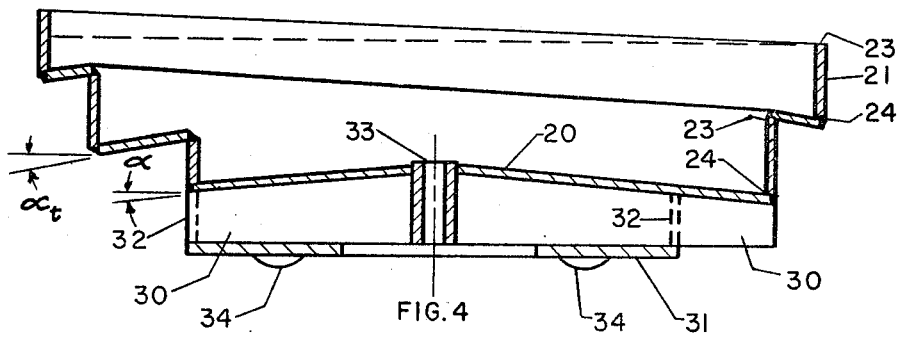
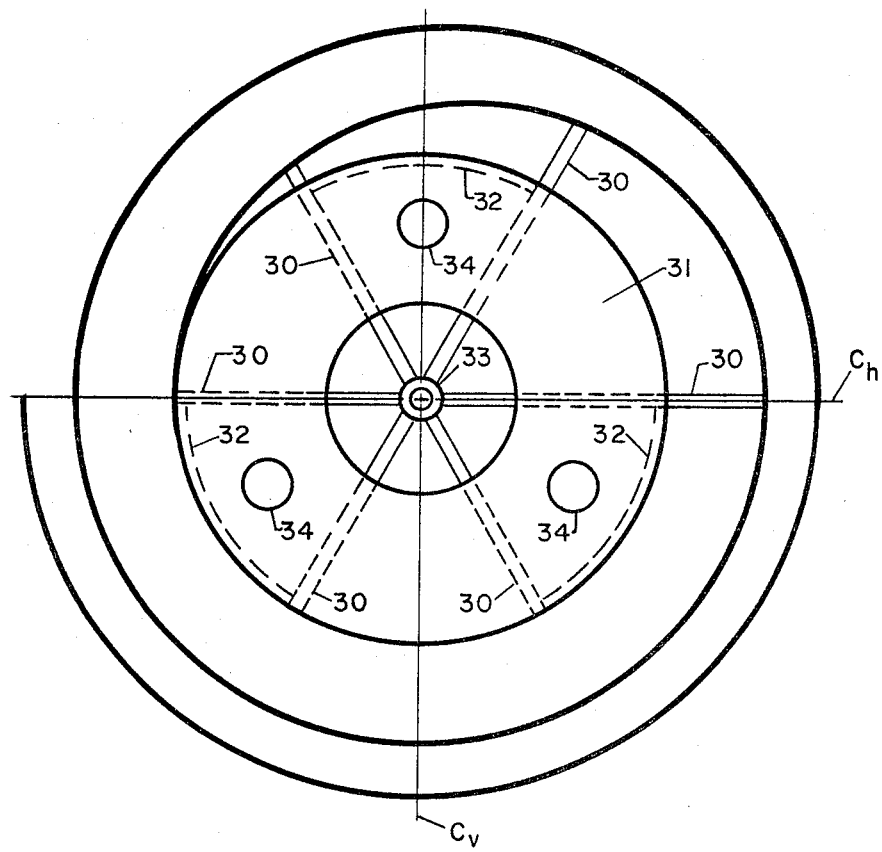
FIG. 5
INVENTOR.
WARREN C. BURGESS JR.

3,280,964
FEEDER BOWL CONSTRUCTION
Warren C. Burgess, Jr., 27018 Keennedy Ridge Road,
North Olmsted, Ohio
Filed Sept. 1, 1964, Ser. No. 393,618
8 Claims. (Cl. 198—220)

This invention relates in general to feeder bowls, and more particularly to a feeder bowl which is characterized by a conveying surface which is partly spiraliform, and partly cylindrical to provide a curved upwardly and outwardly extending conveying portion, and a portion which is curved and extends upwardly but does not extend outwardly from the center of the bowl. More especially, the invention applies to feeder bowls having a combination of a converging spiral conveying surface followed by a constant width conveying surface. The constant width conveying surface is conveniently used as a section in which "tooling" is disposed for the purpose of orienting parts in a predetermined order and rejecting parts which cannot be so oriented for return to the central bowl bottom. The constant width conveying surface as indicated above is so designed and located as to provide for movement of parts along a constant radius from the center of the bowl, which center is also the center of the vibratory drive system.

The bowls of the present invention are useful for attachment to conventional vibratory drive systems such as those illustrated in FIG. 1 of my Patent No. 2,985,280. The vibratory driving means which may be used in conjunction with the completed apparatus may be a pneumatic free piston vibration inducing device such as disclosed in FIG. 2 of the aforesaid Patent No. 2,985,280, or a conventional electromagnetic vibratory drive, or a mechanical vibration inducing device. Any suitable drive means for imparting parts conveying vibratory motion to the bowl may be employed. Conventional leaf type springs disposed at an angle relative to the bowl and secured to the base thereof, and also secured to a massive weight base, may be used. These springs are normally spaced equidistant from a central vertical axis passing through the center of the bowl and at equally spaced intervals therearound. The drive means generally applies vibratory force along the axis. Such bowl structures are conventional and well known, and need not be further described in the present application since the complete structure forms no part of the invention hereof other than to provide an environment wherein the devices of this invention may be used.

Heretofore spiral conveyor feeding bowls have been constructed in a manner so that the conveyor track extends farther from the center of the bowl as it progresses upwardly in a true spiral path. It has been found that a part, such as a washer, a bolt, a transistor, a nozzle or the like, tends to convey along a path which is exactly concentric with the center line or central axis of the bowl rather than along a spiral path. Therefore, inherent in all true spiral path bowls whether cast or fabricated, is a tendency for the parts to convey away from the side wall. This tendency is detrimental to reliable feeding action, particularly in the section which we have identified above as the "tooling" section. It has also been found that there is a tendency for the vertical side walls on the outside edge of the spiral path to strike the parts on the forward part of the stroke thereby causing instabilities or irregular actions which are again detrimental to reliable feeding action.

The cylindrical track feeder bowls, which provide maximum conveying stability along the tracks, have been constructed heretofore with the cylindrical tracks raised up from the bowl bottom. One track thereby was located above the other. Several problems are inherent with such cylindrical bowls. The side wall mass was located at the maximum bowl diameter thereby increasing the polar moment of inertia greatly. This increased mass necessitated using more powerful vibratory drive means than the spiral construction. Secondly, the bowl load could quickly move to the outside of such a bowl and thus cause a greater variation in vibratory amplitude and thus variation in speed than with a spiral bowl. Thirdly, it was easy for parts to bunch up and jam between the tracks when the tracks were located one above the other. Also construction was more difficult than the spiral and thus more costly. Therefore, even though the feeding action was optimum from a stability point of view, such feeding action was sacrificed to eliminate the undesirable features of the cylindrical bowls.

The present invention provides a constant radius track portion in which "tooling" may be provided for the purposes above indicated. Such constant radius track portion provides a path for the parts to move along in response to vibratory motion which coincides with the natural path that the parts would take due to the conveying action of the vibratory system. Cast and fabricated spiral conveyor feeding bowls have heretofore employed tracks of uniform width which continue from near the bottom of the bowl to the top or exit point.

By the term "constant radius track portion" is meant that the outer marginal edge of the track in this portion has a constant radius with reference to the center of the bowl. By the term "spiraliform track portion" is meant that the median line of the track in this portion has a variable radius with reference to the center of the bowl.

In the preferred embodiments of the present invention, there is provided a converging bulk supply track portion which starts at the bottom of the bowl and spirals upwardly and outwardly as it converges in width until it meets the previously mentioned constant radius "tooling" section. Not only does this track eliminate the undesirable features of cylindrical bowls, but it has also been found that such a supply track provides distinct advantages over the constant width track. Pieces or parts disposed crosswise as they start up a spiraliform constant width track, drop off rather near the entrance, and in so dropping off often abruptly pull off large quantities of parts that are satisfactorily aligned. This results in spaces on the track where there are no parts and reduces the delivery rate and efficiency of the feeding equipment.

By using a gradual converging track which is wider at its beginning at the bottom of the bowl than at its end which communicates with the constant radius "tooling" section, parts that are partially or fully crosswise on the track are allowed to proceed up the track, and often under the influence of the vibratory action work around into a position where they may be saved and fed into the "tooling" section. This construction also provides a gradual method for thinning out the supply on the track which has been found much more efficient than the abrupt method of the constant width track. Depending upon the shape and nature of the parts being fed, the use of a converging supply track portion such as described above increases the delivery rate of the equipment by as much as 20% to 30%.

It should be understood that the concept of blending the two types of track portion together i.e. a spiraliform upwardly and outwardly extending track portion, and a constant radius track portion together applies equally well to fabricated and cast bowls e.g. cast aluminum bowls. The employment of a converging spiraliform structure provides even greater part feeding efficiency.

Briefly stated, the present invention is in a feeder bowl comprising a bowl from which parts are to be fed in aligned oriented manner, said bowl having a bottom portion having a predetermined center point the central portion of which is elevated relative to the periphery of the bottom and serving as a reservoir in which parts are randomly disposed. Communicating with and extending upwardly and outwardly from said bottom portion there is provided a peripheral upwardly and outwardly extending spiraliform track portion. Preferably this track portion decreases in width as it proceeds from the bottom toward the upper marginal edge of the bowl. The spiraliform track portion leads into and communicates with a constant radius track portion, the marginal edges of which are circular arcs each struck from a predetermined center. The constant radius track portion has a width at its beginning equal to the width of the upper end of the spiraliform track portion. Thus, the track width of the composite track of the feeder bowl of this invention may be converging from the beginning of the track to the exit from the bowl; it may be of uniform width from the beginning of the track to the exit from the bowl; it may diverge from the beginning of the track to the exit of the bowl, or it may be a combination of converging or diverging track portions with constant width track portions. In the preferred embodiment the spiraliform track portion converges from a wide mouth or entrance to the track at the bottom of the bowl to a predetermined width at its upper extremity. The constant radius portion of the track has a constant width equal to the width of the spiraliform portion at its upper extremity. The bowl is completed with a curved side wall portion extending between adjacent edges of the spiraliform track portion and the periphery of the bottom portion, between adjacent edges of the constant radius track portion and the spiraliform portion, and continuing around the perimetral portion of the track edge to a point adjacent the end of the constant radius track portion or exit from the bowl.

To the accomplishment of the foregoing and related ends, said invention, then, consists of the means hereinafter fully described and particularly pointed out in the appended claims, the following description and annexed drawings setting forth in detail certain illustrative embodiments of the invention, such disclosed means constituting, however, but a few of the various forms in which the principle of this invention may be employed.

In the annexed drawings:

FIG. 1 is a view illustrating a layout for forming the bottom portion, the spiraliform track portion, and the constant radius track portion of a feeder bowl in accordance with the present invention.

FIG. 2 is a view of one form of side wall strip to be secured to the track edges.

FIG. 3 is a view of another form of side wall strip for providing different slope portions of the track.

FIG. 4 is a sectional view of a feeder bowl constructed in accordance herewith as it appears in a vertical plane passing through the center of the bowl.

FIG. 5 is a bottom view of one form of bowl constructed in accordance herewith showing details of preferred construction therefor.

Referring now more particularly to the drawings, the actual details of the construction used in FIG. 1 to obtain the combination of a converging track portion and a constant radius "tooling" track portion is only one of many which could be used arbitrarily to achieve this particular result.

Accordingly, in FIG. 1, there is illustrated a simple form of laying out on a flat sheet of bowl forming material, for example sheet steel, sheet stainless steel, glass fiber reinforced resin, or the like. The design of the track for feeding parts from a bowl type parts feeder necessitates preliminary assumptions. Based upon the knowledge of the particular part to be fed and its behavior upon inclined spiraliform tracks, and the requirements for feeding, a predetermined bowl size is selected having an overall diameter, $d_I$, for example 17.5″. There is also selected a track width for the constant radius "tooling" section which is more closely related to the size of the part being conveyed. This track width is identified as $W_t$, e.g. 1″.

There is also assumed a desired track width at the beginning of the spiraliform portion of the track identified as $W_e$ signifying track entrance width. $W_e$ may be the same as $W_t$ or, in the preferred design, larger than $W_t$ for example 2″. The ratio of convergence is then determined by the formula:

$$X = W_e/W_t$$

The center of the bowl, O, is located and horizontal center line $C_h$ and vertical center line $C_v$ drawn through O. The centers of arcs are then conveniently established along the horizontal center line $C_h$. Arc I has a radius $R_I$ which is equal to one half of $d_I$, e.g. 8.75″. The arc is struck from the center O, and extends through 180°.

The second radius, $R_{II}$ has a length determined by the formula:

$$R_{II} = \tfrac{1}{2}(d_I - W_t)$$

The arc II is struck on a center located on $C_h$, a distance A from the center point O. The distance A is determined by the formula:

$$A = W_t/2$$

Arc II is also a 180° arc.

Arc III is struck from the center O through 180° and has a radius $R_{III}$ which is determined by the formula:

$$R_{III} = \tfrac{1}{2}(d_I - 2W_t)$$

It will be observed that arcs I and III are struck from the same center O and differ from each other by an amount equal to $W_t$. This portion becomes the constant radius track portion.

Arc IV is also a 180° arc having a radius $R_{IV}$ which is determined by the formula:

$$R_{IV} = \frac{d_I}{2} - \frac{W_t}{4}(X+5)$$

This arc is struck from a center located on $C_h$ a distance C from the bowl center O. The distance C is determined by the formula:

$$C = \frac{W_t}{4}(X+1)$$

Arc V is also a 180° arc extending between points 1 and 2 lying on $C_h$. Radius $R_V$ has a length which is determined by the formula:

$$R_V = \frac{d_I}{2} - \frac{W_t}{4}(3X+5)$$

Arc V is struck from a center lying on $C_h$ a distance B to the left of center O. The distance B is determined by the formula:

$$B = \frac{W_t}{4}(X-1)$$

It should be understood that the layout shown in FIG. 1 is merely illustrative of one mode of laying out a composite track structure in accordance with the present invention. For example, the spiraliform portion may be constructed on centers located within the quadrants defined by the horizontal and vertical center lines. Also it should be clearly understood that the track width may be constant from the beginning to the exit point at the end 27 of the constant radius portion.

As previously indicated the central portion of the bowl 20 is desirably elevated with respect to the peripheral portions. Although the geometric configuration of the bottom of the bowl may be any which results in the center O being elevated with respect to the peripheral portions, for example by forming the bottom of the bowl as a sector of a sphere, it is preferred to utilize the geometric configuration of a cone having its apex at the center O. The formation of the cone is conveniently effected by removing the wedge portion 28. It is preferred to remove this pie shape sector 28 in the region shown in FIG. 1, i.e. in the fourth quadrant. As best shown in FIG. 4, the cone has a slope alpha, α, the distance S is determined by the formula:

$$S = 2\pi r_1 (1 - \cos \alpha)$$

The portion bounded by radius $r_1$, the vertical center line dividing quadrants 4 and 1 and the portion of the arc V identified as S is the pie-shaped portion which is cut out to enable the formation of a conical bowl bottom portion.

It is frequently desirable to provide slope to the track which is downward toward the side wall of the bowl. The track slope $\alpha_t$ may vary from one portion of the track to another, and in many cases this is desirable to control manner and rate of feeding. There considerations are dictated primarily by the need of particular type of parts and the conveying action, and are not necessarily the same as that slope of the central or conical area of the bowl. The extent of the slope of the track $\alpha_t$ is determined by the S formula to some extent, the width of the saw cut along the layout line extending from 1 through 4 shown in FIG. 1, and/or the cutting of a double layout line instead of the single layout line shown in FIG. 1. As is well known in the sheet metal trade cutting a wider gap between the spiral or cylindrical track portions, as shown in FIG. 1, will achieve a greater downward outward slope, $\alpha_t$, when the tracks are pulled in and welded to a vertical surface, for example the side wall strip of FIGS. 2 or 3, as the tracks are extended upwardly. This, of course, applies to the fabricated bowl. Different layout and saw cut widths have been employed even to the extent of providing a negative slope of the track such that the track slopes down and inwardly toward the center of the bowl.

After the layout of FIG. 1 or its equivalent has been made on a flat plate of suitable thickness and material, the pattern is then sawed out starting at 6 and following along the arcs I through V, and passing through points numbered 5, 4, 3, 2, until point 1 is reached. The end of the track is cut off from point 6 to point 4. The wedge portion 28 is also cut out.

The conical shape of the bottom of the bowl is achieved by pulling the edges 0–7 and 0–8 together and welding them along the resulting seam.

The track configuration is achieved by pulling the track apart in an upward direction and welding in a side strip of the type shown in FIGS. 2 and 3. Referring to the side wall strip 21 shown in FIG. 2, where is here provided a wedge shaped portion 29, the marginal edges of which include an angle beta, β. This angle is preselected and is usually in the range of from about 1° to about 5° with 3° being a convenient angle for determining the rise of the track from the bottom to the top of the bowl.

The point 1 indicated in FIG. 2 is secured to the point 1 indicated in FIG. 1. The bottom marginal edge 24 is welded to the peripheral edge of the conical bottom portion of the bowl 20, and the top marginal edge 23 is welded to the adjacent edge of the track. At point 3, the spiraliform portion of the track terminates, and the constant radius portion begins. Thus, at this point the side wall 21 alters its configuration and assumes the shape of a parallelogram as shown in FIG. 2. If it is desired to level off the top of the bowl to improve its appearance then the strip 23 is cut along the dotted line to give a level top appearance.

As indicated above, it is frequently desired to vary the slope α of the track in the "tooling" section in order to control the rate of feed and/or the orientation of parts. The side wall strip 22 shown in FIG. 3 enables such a variation in the slope or camber of the track. The portion extending between points 1 and 3 of side wall portion 22 is the same as the portion 29 of the side wall of FIG. 2 and is identified as 29a. Again the angle beta, β, is determined by the desired track slope.

In the region between points 3 and 4, it may be desired to alter the slope of the track. A predetermined angle gamma, γ, is selected, and the top marginal edge 25 sloped away from the normal as indicated in FIG. 3. The edge 25 between points 3 and 4 may be constant at the new angle, and varied between points 4 and 5 to return the slope to normal as shown in FIG. 3. A necessary compensation must be made in lower edge 26 from 5 to 6 to accommodate this change. In order to level off the top of the bowl, the top marginal edge 25 of the strip 22 may be cut along the dotted line as and for the reasons stated in connection with the disclosure of FIG. 2.

In assembly, therefore, of a "constant slope" track (and this is not mathematically accurate since as the side piece spirals out the actual effective track slope angle decreases slightly), the point of the wedge of side piece 21 is attached at point 1 (FIG. 1) and the bottom marginal edge 24 of strip 21 is secured as by welding, to the central area of the cone around to point 3 while the top edge 23 is attached to the corner of the converging track also around to point 3. From this point on the track side wall strip is essentially parallel and of uniform width, the top 23 being attached to the "tooling" section or constant radius track portion from points 3 to 4 and the bottom being attached to the converging or spiraliform track portion all the way around to point 5, and then to the outside edge of the constant radius track portion from points 5 to 6. Various types of cut offs such as illustrated in FIGS. 2 and 3 may be employed to improve the appearance of the top edge of the bowl to the extent of giving a level or partially level bowl top for the last part or all of the revolution.

As indicated in FIG. 3, the side wall forming strip can also be modified so that the top surface line 25 is dropped down at a certain point 3 in order that the rate of track rise in the "tooling" section will not be as great as in the previous track sections. By doing this the parts will accelerate at this point and tend to space themselves apart. This has advantages in the efficiency and performance of various tooling devices, such as air jets, placed in the "tooling" section to reject misaligned articles, or parts that are proceeding up the track backwards, for example.

The bowls of this invention preferably utilize a track width in the constant radius track portion which is not of the exact width to allow only single file movement of the parts. Experience has shown that it is far more efficient to allow two or more parts to travel abreast in the "tooling" section until such time as a notch, or a cam, or an air jet, or a lug type device may be used to thin the parts down to a single file. Often when one part enters a tooling slot or other device, it uses less track space than before it entered the tooling device. If another part is traveling along side the first part, this second part often can then also enter the tooling device and thereby increase the rate of output of oriented parts.

FIG. 5 shows the details of a bottom structure for a bowl of the type herein described. There are provided radial ribs 30, circular annular plate 31, a center post 33 and gussets 32 coacting with bottom 20 in combination to achieve a quasi "D" section familiar to designers of aircraft wings. The purpose of the "D" section is to achieve maximum rigidity with minimum weight by means of tension and compression of the surfaces above and below the ribs. It has been prior practice in fabricated bowls to merely provide rings underneath a central cone and to rely upon the thin lower wall of the bowl and the track to resist flexure. With such a structure, dead spots often occurred and poor conveying resulted. The rib and lower plate construction shown in FIG. 5 together with gussets 32 in between alternate pairs of ribs 30 and the center post 33 have proved to be a type of construction which provides a uniform feed rate, absence of dead spots, and having a high degree of rigidity heretofore achieved only with heavy cross-section cast bowls. Buttons 34 are welded spots of metal secured to the bottom plate 31 to provide pedestals on which the bowl may be stably supported.

There has thus been provided a parts feeder bowl construction which is characterized in that it provides a trackway leading from a bottom parts reservoir portion, which track is composite in nature. That is the track is composed of at least two distinct sections: a first spiraliform section which progresses upwardly and outwardly from the bottom of the bowl and leads into a second constant radius section which moves only upwardly relative to the bottom of the bowl but does not move outwardly with respect to the central axis of the bowl. It is convenient although not necessary to form all of these elements from a single sheet. Side walls are provided as a second part extending between adjacent edges of the spiraliform track portion and the bottom, the spiraliform track portion and the constant radius portion, and continuing around the perimetral portions of the constant radius track portion to the exit from the bowl. Such a structure accounts for and utilizes to advantage the tendency of parts to move along the trackway exactly concentrically rather than along a spiral path. In the spiral section which is essential to raise the parts from the bottom of the bowl and distribute them on a trackway, the tendency to move exactly concentrically is overcome by sloping the track downwardly and outwardly. A part is technically unstable in this region but this is unimportant since the main purpose of the spiraliform track portion is to move the part up to the constant radius "tooling" section. It is this second track section that is designed to coincide with and utilize to advantage the natural path which parts will take due to conveying action imparted by a vibratory drive operating along the central axis of the bowl which is supported from a base by a plurality of flat leaf type springs disposed at an angle relative to the base and the bottom of the bowl. Such a structure increases the delivery rate of parts by as much as from 20% to 30%.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. A feeder bowl comprising:
   (a) a bottom portion having a predetermined center point, the central portion of which is elevated relative to the periphery of the bottom;
   (b) a peripheral upwardly and outwardly extending spiraliform track portion having inner and outer marginal edges communicating with and extending upwardly and outwardly from said bottom portion;
   (c) a peripheral upwardly extending constant radius track portion also having inner and outer marginal edges communicating with said spiraliform track portion at the upper end thereof, the outer marginal edge of said constant radius track portion being a circular arc struck from said predetermined center; and
   (d) a continuous curved upstanding side wall portion extending between the adjacently disposed inner marginal edge of the spiraliform track portion and the periphery of the bottom portion, between the adjacently disposed inner marginal edge of the constant radius track portion and the outer marginal edge of the spiraliform portion, and continuing around the outer edge of the track to a point adjacent the end of the constant radius track portion.

2. A feeder bowl comprising:
   (a) a bottom portion having a predetermined center point, the central portion of which is elevated relative to the periphery of the bottom;
   (b) a peripheral upwardly and outwardly extending spiraliform track portion having inner and outer marginal edges communicating with and extending upwardly and outwardly from said bottom portion;
   (c) a peripheral upwardly extending constant radius track portion also having inner and outer marginal edges communicating with said spiraliform track portion at the upper end thereof, the marginal edges of said constant radius track portion being circular arcs each struck from said predetermined center, said constant radius track portion having a width at its beginning equal to the width of the upper end of said spiraliform track portion; and
   (d) a continuous curved upstanding side wall portion extending between the adjacently disposed inner marginal edge of the spiraliform track portion and the periphery of the bottom portion, between the adjacently disposed inner marginal edge of the constant radius track portion and the outer marginal edge of the spiraliform portion, and continuing around the outer edge of the track to a point adjacent the end of the constant radius track portion.

3. A feeder bowl comprising:
   (a) a bottom portion having a predetermined center point, the central portion of which is elevated relative to the periphery of the bottom;
   (b) a peripheral upwardly and outwardly extending spiraliform track portion having inner and outer marginal edges communicating with and extending upwardly and outwardly from said bottom portion and having a track width at the point of communication with said bottom portion greater than the track width at the upper end of said spiraliform track portion;
   (c) a peripheral upwardly extending constant radius track portion also having inner and outer marginal edges communicating with said spiraliform track portion at the upper end thereof, the circular arcs defining the marginal edges of which are each struck from said predetermined center, said constant radius track portion having a width equal to the width of the upper end of said spiraliform track portion; and
   (d) a continuous curved upstanding side wall portion extending between the adjacently disposed inner marginal edge of the spiraliform track portion and the periphery of the bottom portion, between the adjacently disposed inner marginal edge of the constant radius track portion and the outer marginal edge of the spiraliform portion, and continuing around the outer edge of the track to a point adjacent the end of the constant radius track portion.

4. A feeder bowl comprising:
   (a) a bottom portion having a predetermined center point, the central portion of which is elevated relative to the periphery of the bottom;
   (b) a peripheral upwardly and outwardly extending spiraliform track portion having inner and outer marginal edges communicating with and extending upwardly and outwardly from said bottom portion and having a track width at the point of communication with said bottom portion greater than the track width at the upper end of said spiraliform track portion, said spiraliform track portion being formed by a connected series of circular arcs struck on centers spaced from said predetermined centers;
   (c) a peripheral upwardly extending constant radius track portion also having inner and outer marginal edges communicating with said spiraliform track portion at the upper end thereof, the circular arcs defining the marginal edges of which are each struck from said predetermined center, said constant radius track portion having a width equal to the width of the upper end of said spiraliform track portion; and
   (d) a continuous curved upstanding side wall portion extending between the adjacently disposed inner marginal edge of the spiraliform track portion and the periphery of the bottom portion, between the adjacently disposed inner marginal edge of the constant radius track portion and the outer marginal edge of the spiraliform portion, and continuing around the outer edge of the track to a point adjacent the end of the constant radius track portion.

5. A feeder bowl comprising:
(a) a bottom portion having a predetermined center point, the central portion of which is elevated relative to the periphery of the bottom;
(b) a peripheral upwardly and outwardly extending spiraliform track portion having inner and outer marginal edges communicating with and extending upwardly and outwardly from said bottom portion and having a track width at the point of communication with said bottom portion greater than the track width at the upper end of said spiraliform track portion, said spiraliform track portion being formed by a connected series of circular arcs struck on centers located on a line passing through said predetermined center, but spaced from said predetermined centers;
(c) a peripheral upwardly extending constant radius track portion also having inner and outer marginal edges communicating with said spiraliform track portion at the upper end thereof, the circular arcs defining the marginal edges of which are each struck from said predetermined center, said constant radius track portion having a width equal to the width of the upper end of said spiraliform track portion; and
(d) a continuous upstanding side wall portion extending between the adjacently disposed inner marginal edge of the spiraliform track portion and the periphery of the bottom portion, between the adjacently disposed inner marginal edge of the constant radius track portion and the outer marginal edge of the spiraliform portion, and continuing around the outer edge of the track to a point adjacent the end of the constant radius track portion.

6. A feeder bowl in accordance with claim 5 in which the arcs defining said constant radius track portion are 180° arcs.

7. A feeder bowl in accordance with claim 5 in which the arcs defining said spiraliform track portion are each 180° arcs.

8. A feeder bowl in accordance with claim 5 in which the bottom portion is conical and the apex is elevated relative to the periphery thereof.

References Cited by the Examiner
UNITED STATES PATENTS

| | | |
|---|---|---|
| 2,832,464 | 4/1958 | Smith. |
| 2,874,667 | 2/1959 | Spurlin _____ 113—116 |
| 2,901,095 | 8/1959 | Smith. |
| 2,915,165 | 12/1959 | Bell. |
| 3,066,631 | 12/1962 | Geary _____ 113—116 |

ANDRES H. NIELSEN, *Primary Examiner.*

RICHARD E. AEGERTER, *Examiner.*